United States Patent
Phan et al.

(10) Patent No.: US 9,277,597 B2
(45) Date of Patent: Mar. 1, 2016

(54) ELECTRICALLY EXTENSIVELY HEATABLE, TRANSPARENT OBJECT, METHOD FOR THE PRODUCTION THEREOF, AND USE THEREOF

(75) Inventors: Dang Cuong Phan, Aachen (DE); Gunther Schall, Kreuzau (DE)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 934 days.

(21) Appl. No.: 13/256,600

(22) PCT Filed: May 21, 2010

(86) PCT No.: PCT/EP2010/057037
§ 371 (c)(1),
(2), (4) Date: Sep. 14, 2011

(87) PCT Pub. No.: WO2010/136400
PCT Pub. Date: Dec. 2, 2010

(65) Prior Publication Data
US 2012/0000896 A1    Jan. 5, 2012

(30) Foreign Application Priority Data
May 29, 2009   (DE) .................. 10 2009 025 888

(51) Int. Cl.
*B60L 1/02* (2006.01)
*H05B 3/86* (2006.01)

(52) U.S. Cl.
CPC ............ *H05B 3/86* (2013.01); *H05B 2203/008* (2013.01); *H05B 2203/013* (2013.01); *Y10T 156/10* (2015.01)

(58) Field of Classification Search
CPC ........................................................ H05B 3/86
USPC .................... 219/203, 522, 541, 543–544
See application file for complete search history.

(56) References Cited

U.S. PATENT DOCUMENTS

| | | |
|---|---|---|
| 4,010,304 A | 3/1977 | Cohen |
| 4,385,226 A | 5/1983 | Sauer |
| 4,565,719 A | 1/1986 | Phillips et al. |
| 4,655,811 A | 4/1987 | Bitter |
| 4,725,710 A | 2/1988 | Ramus et al. |

(Continued)

FOREIGN PATENT DOCUMENTS

| | | | |
|---|---|---|---|
| DE | 102004050158 | * 10/2004 | ........ B32B 17/10036 |
| DE | 69731268 T2 | 9/2006 | |

(Continued)

OTHER PUBLICATIONS

PCT Written Opinion issued for PCT Application No. PCT/EP2010/057037 filed on May 21, 2010, in the name of Saint-Gobain Glass France (English + German).

(Continued)

*Primary Examiner* — Phuong Nguyen
(74) *Attorney, Agent, or Firm* — Steinfl & Bruno LLP

(57) ABSTRACT

An electrically extensively heatable, transparent object includes at least one electrically conductive, transparent coating on an electrically insulating substrate. An electrically conductive band is connected to two electrical busbars and is applied on the coating and at least partially surrounds the periphery of a data transmission window. The electrically conductive band has at least one interruption that separates a greater part of the electrically conductive band from busbars.

11 Claims, 2 Drawing Sheets

(56) References Cited

U.S. PATENT DOCUMENTS

| | | | |
|---|---|---|---|
| 4,985,312 A | 1/1991 | Furuya et al. | |
| 5,111,329 A | 5/1992 | Gajewski et al. | |
| 5,324,374 A | 6/1994 | Harmand et al. | |
| 6,559,419 B1 * | 5/2003 | Sol | B32B 17/10192 219/203 |
| 6,670,581 B1 | 12/2003 | Degand | |
| 7,223,940 B2 | 5/2007 | Voeltzel et al. | |
| 2007/0029186 A1 | 2/2007 | Krasnov et al. | |
| 2009/0044464 A1 * | 2/2009 | Schmidt et al. | 52/171.2 |
| 2010/0006555 A1 * | 1/2010 | Maurer et al. | 219/203 |

FOREIGN PATENT DOCUMENTS

| | | |
|---|---|---|
| EP | 0638528 A1 | 2/1995 |
| EP | 1104030 A2 | 5/2001 |
| EP | 0718250 A2 | 7/2003 |
| EP | 0847965 B1 | 10/2004 |
| EP | 1183912 B1 | 1/2005 |
| EP | 0827212 A2 | 12/2005 |
| EP | 1672960 A1 | 6/2006 |
| EP | 1672960 A1 * | 6/2006 ............... H05B 3/86 |
| WO | 0072635 A1 | 11/2000 |
| WO | 03/024155 A2 | 3/2003 |
| WO | 2005042246 A1 | 5/2005 |
| WO | 2006034346 A1 | 3/2006 |
| WO | 2006091531 A2 | 8/2006 |
| WO | 2007149082 A1 | 12/2007 |

OTHER PUBLICATIONS

PCT International Search Report issued for PCT Application No. PCT/EP2010/057037 filed on May 21, 2010 in the name of Saint-Gobain Glass France (English + German).

* cited by examiner

ELECTRICALLY EXTENSIVELY HEATABLE, TRANSPARENT OBJECT, METHOD FOR THE PRODUCTION THEREOF, AND USE THEREOF

CROSS REFERENCE TO RELATED APPLICATIONS

The present application is the US national stage of International Application PCT/EP2010/057037 filed on May 21, 2010, which in turn, claims priority to German Patent Application No. 10 2009 025 888.4 filed on May 29, 2009.

The present invention relates to a new transparent, electrically extensively heatable object, comprising a transparent, electrically insulating substrate with an extensive, electrically conductive, transparent coating, including at least one localized transparent area free of the electrically conductive coating.

Moreover, the present invention relates to a new method for production of a transparent, electrically extensively heatable object, comprising a transparent substrate with an extensive, electrically conductive, transparent coating, including at least one localized transparent area free of the electrically conductive coating.

And, not least, the present invention relates to the new use of the new transparent object, comprising a transparent, electrically insulating substrate with a transparent, electrically extensively heatable coating, including at least one localized transparent area free of the electrically conductive coating, as well as the transparent, electrically extensively heatable object, comprising a transparent substrate with an extensive, electrically conductive, transparent coating, including at least one localized transparent area free of the electrically conductive coating produced using the new method.

From European Patent EP 1 183 912 B1, an automotive glazing panel or pane, in particular, a windshield, with a transparent, electrically extensively heatable coating for sun protection or for solar control or solar regulation is known. The electrically heatable coating is connected to two electrical busbars that transmit the electrical power to the electrically heatable coating. This known windshield has at least one data transmission window or so-called camera field or sensor field through which a camera or a sensor can "look through" the windshield. This window or field is positioned in partial contact with the electrically extensively heatable coating. However, the homogeneity of the electrical field in the extensive, electrically conductive coating is destroyed by this discrete spot. This can create hot and cold spots in the windshield that cause thermal stresses that can result in damage to the windshield and/or light spots that can interfere with vision.

The European Patent EP 1 183 912 B1 attempts to counter this serious problem in that at least one portion of the periphery of the discrete spot is bounded by an electrically conductive band that is connected with a busbar and that has an electrical resistance that is significantly lower than the electrical resistance in ohms per square than the electrical resistance in ohms per square of the extensive, electrically conductive coating. In particular, the electrically conductive band should have an electrical resistance of <0.35 and, in particular, <0.05 ohms per square.

Although, through this measure, the homogeneity of the electrical field can be improved and the formation of hot and cold spots and/or light spots can be suppressed to a certain extent, the level achieved is not completely satisfactory but requires further improvement.

The object of the present invention is to eliminate the disadvantages of the prior art and, in particular, to further improve the automobile glazing panels or panes known from the European Patent EP 1 183 912 B1, in particular windshields, relative to the homogeneity of the electric field and the suppression of the formation of hot and cold spots, in order to effectively prevent damage to the panes through thermal stresses and/or interference with vision due to light spots.

In particular, the object of the present invention was to make available new, improved, transparent, electrically extensively heatable objects, in particular new laminated safety glass panes, especially new windshields that are coated with an extensive, transparent coating made of an electrically conductive material, in which there is at least one localized transparent area free of the electrically conductive coating, in particular a camera or sensor field, whose periphery is at least partially surrounded by an electrically conductive band, whose resistance in ohms per square is substantially lower than the resistance in ohms per square of the extensive, electrically conductive coating. The new, electrically extensively heatable, transparent objects should, in particular, be significantly improved with regard to the homogeneity of the electrical field and the suppression of the formation of hot and cold spots, in order to effectively prevent damage to the panes through thermal stresses and/or interference with vision due to light spots.

Moreover, the object of the present invention is to make available a new, improved method for production of transparent, electrically extensively heatable objects, in particular laminated safety glass panes, especially windshields, which [method] no longer has the disadvantages of the prior art, but rather, in a simple and quite readily reproducible manner, delivers, in large quantities, transparent, electrically extensively heatable objects that have a transparent coating made of an electrically conductive material, wherein there is, in the extensive, electrically conductive coating, at least one localized transparent area free of the electrically conductive coating, in particular, a camera or sensor field, whose periphery is at least partially surrounded by an electrically conductive band whose resistance in ohms per square is substantially lower than the resistance in ohms per square of the extensive, electrically conductive coating. The electrically extensively heatable transparent objects produced using the new method should be improved, in particular with regard to the homogeneity of the electrical field and the suppression of the formation of hot and cold spots, in order to effectively prevent damage to the panes through thermal stresses and/or interference with vision due to light spots.

And, not least, the object of present invention was to find a new use for the new, improved, electrically extensively heatable, transparent objects and the electrically extensively heatable, transparent objects in means of transportation for land, air, and water traffic as well as in the construction, furniture, and equipment sector, whereas it is, in particular, important in the new application that, in the relevant electrically extensively heatable, transparent objects, a homogeneous or substantially homogeneous electrical field is formed upon application of electrical voltage without hot and cold spots such that thermal stresses and/or light spots can no longer occur.

Accordingly, the new, electrically extensively heatable, transparent object (1) has been discovered, that comprises
  at least one transparent, electrically insulating substrate (2),
  at least one extensive, electrically conductive, transparent coating (3), that is
  connected to two electrical busbars (4.1 and 4.2) to transmit electrical power, at least one localized transparent area (5) free of the electrically conductive coating (3), and an electrically conductive band (6) applied on the coating (3) that at least partially surrounds the periphery of the at least one area (5), has an electrical resistance in ohms per square that is lower than the electrical resistance in ohms per square of the coating (3), wherein the electrically conductive band (6) has at least one interruption (6.1).

In the following, the new, electrically extensively heatable, transparent object (1) is referred to as the "object according to the invention".

Moreover, the new method for production of an electrically extensively heatable, transparent object (1) has been discovered, wherein (I) an electrically conductive material (3.1) is applied extensively on a transparent, electrically insulating substrate (2), such that at least one transparent, electrically conductive coating (3) that contains or is made of the material (3.1), and at least one localized transparent area (5) free of the coating (3) result, (II) the coating (3) is connected to two busbars (4.1 and 4.2), and (III) an electrically conductive band (6) is applied to the coating at least partially in the periphery of the area (5), and has an electrical resistance in ohms per square that is lower than the electrical resistance in ohms per square of the coating (3), wherein the process step (III) is carried out such that the electrically conductive band (6) has at least one interruption (6.1).

In the following, the new method for production of an electrically extensively heatable, transparent object (1) is referred to as the "method according to the invention".

And, not least, the new use of the object according to the invention and of the electrically extensively heatable, transparent object produced using the new method in means of transportation for land, air, and water traffic as well as in the construction, furniture and equipment sector has been discovered, which is referred to in the following as the "use according to the invention".

With regard to the prior art, it was surprising and not predictable for the person skilled in the art that the object of the present invention could be accomplished using the object according to the invention, the method according to the invention, and the use according to the invention.

In particular, it was surprising that the object according to the invention no longer had the disadvantages of the prior art, but rather that it was significantly improved with regard to the homogeneity of the electrical field and the suppression of the formation of hot and cold spots, through which the damage to the panes through thermal stresses and/or interference with vision due to light spots were effectively prevented.

Moreover, it was surprising that the method according to the invention delivered, in large quantities, in a simple and quite readily reproducible manner, transparent, electrically extensively heatable objects, in particular objects according to the invention, that were significantly improved with regard to the homogeneity of the electrical field and the suppression of the formation of hot and cold spots, such that the damage to the panes through thermal stresses and/or interference with vision due to light spots was effectively prevented.

And, not least, it was surprising that the objects according to the invention and the electrically extensively heatable, transparent objects produced using the method according to the invention could be used outstandingly in the context of the use according to the invention in means of transportation for land, air, and water traffic as well as in the construction, furniture, and equipment sector, whereby a homogeneous or substantially homogeneous electrical field without hot and cold spots was formed in them upon application of electrical voltage such that thermal stresses and/or light spots no longer appeared.

The objects according to the invention are transparent. This means that they, at least in individual areas, but, preferably, overall, are permeable to electromagnetic radiation, preferably electromagnetic radiation with a wavelength of 300 to 1,300 nm, but, in particular, to visible light. "Permeable" means that the transmission, in particular for visible light, is >50%, preferably >75%, and, in particular, >80%.

The objects according to the invention can have different three-dimensional shapes. Thus, they can be planar or slightly or greatly curved or bent in one or more directions or have the shape of regular or irregular three-dimensional bodies, such as spheres, cylinders, cones, pyramids with triangular or rectangular bases, double pyramids, cubes, icosahedrons, etc. In particular, they are planar or slightly or greatly curved or bent in one or more spatial directions.

The size of the objects according to the invention can vary broadly and is determined by the respective purpose in the context of use according to the invention. Thus, the objects according to the invention can have a dimension of a few centimeters to multiple meters. In particular, the objects that are planar or slightly or greatly curved or bent in one or a plurality of spatial directions can have a surface area on the order of 100 cm$^2$ to 25 m$^2$, preferably >1 m$^2$. However, the objects according to the invention can also have surface areas like windshields, side windows, and rear windows or large-area panes, as used in the construction sector, commonly have.

The objects according to the invention can have perforations. These can be used to accommodate devices for mounting, for connection to other objects, and/or the passage of conductors, in particular, electrical conductors.

The object according to the invention includes at least one transparent, electrically insulating substrate. Preferably, the substrate has high transmission for electromagnetic radiation of a wavelength of 300 to 1.300 nm, in particular, however, for visible light, preferably transmission >50%, more preferably >75%, even more preferably >85%, and, in particular, >95%.

Accordingly, all transparent, electrically insulating substrates that have such transmission and are thermally and chemically stable as well as dimensionally stable under the conditions of the production and use of the objects according to the invention are fundamentally suitable.

The transparent, electrically insulating substrates can have any three-dimensional shape of the objects that is prescribed for the objects according to the invention that contain them. Preferably, the three-dimensional shape has no shadow zones such that it can be uniformly coated from the gas phase in particular. Preferably, the substrates are planar or slightly or greatly curved in one or a plurality of directions. In particular, planar substrates are used.

The transparent, electrically insulating substrates can be colourless or coloured.

Examples of suitable materials for the production of transparent, electrically insulating substrates are glass and clear plastics, preferably rigid clear plastics, in particular, polystyrene, polyimide, polyester, polyvinyl chloride, polycarbonate, or polymethyl methacrylate.

Preferably, transparent, electrically insulating substrates made of glass are used. Basically, all common and known glasses, as are described, for example, in Römpp-Online 2008 under the keywords "Glas [glass]", "Hartglas [toughened glass]" or "Sicherheitsglas [safety glass]", come into consideration as substrate material. Examples of well-suited glasses are float glass, heat-strengthened float glass, toughened float glass, single-sheet safety glass, instrument glass, laboratory glass, crystal, and optical glass, in particular float glass, heat-strengthened float glass, and toughened float glass.

Examples of suitable glasses are known from the German translation of the European patent EP 0 847 965 B1 with file number DE 697 31 2 168 T2, page 8, par. [0053].

The thickness of the transparent, electrically insulating substrates can vary broadly and, thus, be eminently adapted to the requirements of the individual case. Preferably, glasses with the standard glass thicknesses of 1.0 mm to 25 mm and more preferably of 1.6 mm to 2.1 mm are used.

The size of the transparent, electrically insulating substrates can vary broadly and is based on the size of the objects according to the invention that contain them. Accordingly, the above-described sizes are preferably used.

The transparent, electrically insulating substrates are coated with an extensive, electrically conductive, transparent coating.

Here as well, "transparent" means that the extensive, electrically conductive, transparent coatings are permeable to electromagnetic radiation, preferably electromagnetic radiation with a wavelength of 300 to 1,300 nm, but, in particular, to visible light. "Permeable" means that the transmission, in particular for visible light, is >50%, preferably >75%, and, in particular >80%. Particularly preferred are electrically conductive, transparent coatings that are not permeable to IR radiation, i.e., that they reflect or absorb IR radiation.

The extensive, electrically conductive, transparent coating contains or is made of at least one electrically conductive material.

Accordingly, the extensive, electrically conductive, transparent coating can consist of one layer of an electrically conductive material or of at least two layers of at least two different electrically conductive materials.

Moreover, the extensive, electrically conductive, transparent coating can be constructed from at least one layer of an electrically conductive material and at least one layer of a transparent, dielectric material. For example, the extensive, electrically conductive, transparent coating can consist of a first layer of a transparent, dielectric material, a layer of an electrically conductive material, and a second layer of the same or a different transparent, dielectric material that lie one above the other in the order indicated. It is, however, also possible that the extensive, electrically conductive, transparent coating consist of at least three transparent, dielectric layers and at least two electrically conductive layers that lie alternatingly one above the other, with at least one transparent, dielectric layer located between the electrically conductive layers.

Examples of suitable electrically conductive materials are metals with high electrical conductivity, such as silver, copper, gold, aluminum, or molybdenum, in particular silver or silver alloyed with palladium, as well as transparent, electrically conductive oxides (transparent conductive oxides, TCOs), as they are, for example, described in the American patent application US 2007/029186 A1 on page 3, par. [0026], and page 4, par. [0034].

Preferably, the TCOs are indium tin oxide (ITO), fluorine-doped tin oxide (FTO), aluminum zinc oxide doped with aluminum as well as, possibly, additionally with boron and/or with silver (aluminum zinc oxide, AZO), tin zinc oxide or tin oxide doped with antimony (antimony tin oxide, ATO). Preferably, the TCOs have a specific resistance $\rho$ of 1.0 to 5.0× $10^{-3}$ $\Omega \times m$. Preferably, they have a sheet resistance R□ of 0.5Ω/□ to 15Ω/□ (ohms per square).

The thickness of the extensive, electrically conductive, transparent coating can vary broadly and, thus, be eminently adapted to the requirements of the individual case. It is essential that the thickness of the extensive, electrically conductive, transparent coating not be so high that it becomes nonpermeable to electromagnetic radiation, preferably electromagnetic radiation of a wavelength of 300 to 1,300 nm and, in particular, to visible light.

Preferably, the thickness is from 20 nm to 100 μm.

If the extensive, electrically conductive, transparent coating contains metal, its thickness is preferably 50 to 500 nm, more preferably 75 to 400 nm, and in particular 100 to 300 nm.

If the extensive, electrically conductive, transparent coating contains TCO, its thickness is preferably 100 nm to 1.5 μm, more preferably 150 nm to 1 μm, and in particular 200 nm to 500 nm.

If the extensive, electrically conductive, transparent coating contains at least one transparent, dielectric layer and at least one layer of a metal, its thickness is preferably 20 to 100 μm, more preferably 25 to 90 μm, and in particular 30 to 80 μm.

Examples of suitable extensive, electrically conductive, transparent coatings as well as methods for their production are known from the patent applications and published patents U.S. Pat. No. 4,010,304, col. 1, line 67, to col. 5, line 35,
U.S. Pat. No. 4,565,719, col. 2, line 3, to col. 18, line 51,
U.S. Pat. No. 4,655,811, col. 3, line 56, to col. 13, line 63,
U.S. Pat. No. 4,985,312, col. 1, line 64, to col. 7, line 25,
U.S. Pat. No. 5,111,329, col. 3, line 32, to col. 12,
U.S. Pat. No. 5,324,374, col. 2, line 38, to col. 6, line 37,
EP 0 638 528 A1, page 2, line 19, to page 10, line 57,
EP 0 718 250 A2, page 2, line 42, des [sic] page 13, line 44,
DE 697 31 268 T2, page 3, par. [0011], to page 7, par. [0051], page 8, par. [0060], to page 13, par. [0091],
WO 00/72635 A1, page 3, line 16 to 35, and
U.S. Pat. No. 7,223,940 B2, col. 5, line 8, to col. 6, line 38.

Moreover, transparent plastic films, preferably on the basis of polyamide, polyurethane, polyvinyl chloride, polycarbonate, and polyvinyl butyral, in particular polyurethane, that are coated with at least one of the above-described electrically conductive materials come into consideration.

The extensive, electrically conductive, transparent coating covers the transparent, insulating substrate extensively. Preferably, at least 50%, more preferably at least 70%, particularly preferably at least 80%, and in particular at least 90% of a surface of the electrically insulating, transparent substrate is covered by the extensive, electrically conductive, transparent coating. Thus, the extensive, electrically conductive, transparent coating can even completely cover the transparent, electrically insulating substrate.

In particular, in the case of the above-described planar or curved or bent substrates, the extensive, electrically conductive, transparent coatings can cover the transparent, electrically insulating substrates such that they are surrounded by an electrically insulating area that is free of electrically conductive material. Preferably, this electrically insulating area is located in the edge areas of the electrically insulating, transparent substrates.

The width of the electrically insulating area can vary broadly and, consequently, be eminently adapted to the requirements of the individual case. Preferably, the width is from 0.5 to 10 cm, more preferably 0.5 to 7 cm, and in particular 0.5 to 5 cm.

The electrically insulating area can be covered by a decorative coating.

The extensive, electrically conductive, transparent coating is connected to two electrical busbars to transmit electrical power. The two busbars are arranged in a common and known manner on two opposing sides of the extensive, electrically conductive, transparent coating parallel or substantially parallel to each other. Examples of suitable busbars are known from the international patent applications WO 00/72635 A1 and 2006/091531 A2 or the American patents U.S. Pat. No. 4,385,226, U.S. Pat. No. 4,725,710 or U.S. Pat. No. 7,223,940 B2.

The object according to the invention further comprises at least one, in particular one, localized transparent area free of the electrically conductive coating that is at least partially in contact with the extensive, electrically conductive, transparent coating. Preferably, the localized transparent area free of the electrically conductive coating is completely surrounded by the electrically conductive material of the extensive, electrically conductive, transparent coating.

The dimensions of the localized transparent area free of the electrically conductive coating can vary broadly. Preferably, the localized transparent area free of the electrically conductive coating occupies no more than 20% of the surface of the object according to the invention. If the object according to the invention is the windshield of a means of transportation, in particular of an automobile, the localized transparent area free of the electrically conductive coating is preferably arranged outside the field of vision of the driver.

The localized transparent area free of the electrically conductive coating can fulfill various functions. Preferably, the area serves as a data transmission window that is arranged in front of at least one receiver of data, in particular of data that is transmitted by electromagnetic radiation. Specifically, the area serves as a camera field or sensor field that is arranged in front of a camera or a sensor, with the camera and/or the sensor receiving data in the form of electromagnetic radiation, in particular from the visible range or the IR range, through the object according to the invention.

Preferably, the localized transparent area free of the electrically conductive coating has dimensions as they are known for data transmission windows from the European Patent EP 1 183 912 B1, col. 4, par. [0021].

For the present invention, it is essential that the periphery of the localized transparent area free of the electrically conductive coating be at least partially, in particular completely, surrounded by one electrically conductive band or by at least two electrically conductive bands.

"Periphery" means that the electrically conductive band does not have to be directly adjacent the localized transparent area free of the electrically conductive coating, but can, instead, be located at a certain distance therefrom, preferably 5 mm to 2 cm, such that a part of the extensive, electrically conductive, transparent coating is also enclosed.

Preferably, the electrically conductive band is connected to the busbar, particularly preferably to the busbar that is closest to the data transmission window. In particular, the electrically conductive band is connected to this busbar such that the busbar virtually constitutes a part of the electrically conductive band.

Preferably, the electrically conductive band is located directly on the surface of the extensive, electrically conductive, transparent coating.

The electrically conductive band can, however, also not be connected to busbars, in particular if areas without electrically conductive coating lie far from the busbars.

The electrically conductive band has an electrical resistance in ohms per square that is significantly lower than the electrical resistance in ohms per square of the extensive, electrically conductive, transparent coating. Preferably, the electrical resistance is <0.35, more preferably <0.1, particularly preferably <0.05, and in particular <0.01 ohms per square.

The dimensions of the electrically conductive band can vary quite broadly and, consequently, can be eminently adapted to the requirements of the individual case. In particular, the dimensions are determined by the ratio of the resistances in ohms per square of the electrically conductive band and the extensive, electrically conductive, transparent coating as well as by the area of the part of the extensive, electrically conductive, transparent coating that is enclosed by the electrically conductive band. Consequently, the person skilled in the art can specify the dimensions advantageous in the individual case using his general knowledge of the art, possibly with the assistance of simple orienting experiments or computer simulations.

Preferably, the electrically conductive band is 10 to 100 μm, more preferably 15 to 80 μm, and in particular 20 to 50 μm thick.

Preferably, the electrically conductive band is 100 μm to 3 cm, more preferably 200 μm to 2.5 cm, and in particular 200 μm to 20 mm wide.

The length of the electrically conductive band is determined in particular by the dimensions of the localized transparent area free of the electrically conductive coating that it surrounds.

The electrically conductive band contains electrically highly conductive material. Examples of suitable materials are described above.

For the present invention, it is also essential that the electrically conductive band have at least one interruption or at least two interruptions.

"Interruption" means that a given electrically conductive band is interrupted by an area that is formed by a part of the extensive, electrically conductive, transparent coating.

In a first embodiment of the object according to the invention, there is only one electrically conductive band, in which the at least one interruption is located.

In a second embodiment of the object according to the invention, there are at least two electrically conductive bands, with the at least two interruptions located between at least two parallel areas of the at least two electrically conductive bands. In this instance, at least one of the at least two electrically conductive bands can have at least one interruption within the band.

In both embodiments of the object according to the invention, the area of an electrically conductive band that is parallel or substantially parallel to the busbar to which the band is connected can be wider than the areas that lead to the associated busbar.

In a preferred embodiment of the object according to the invention, the greater part of the electrically conductive band is not electrically conductingly connected to a busbar.

In an object according to the invention, the electrically conductive band can be optically covered, for example, by a decorative opaque coating.

If the electrically insulating, transparent substrate of the object according to the invention is a glass, at least one more layer can be located between its surface and the extensive, electrically conductive, transparent coating. Preferably, the at least one more layer is selected from the group of transparent barrier layers and transparent, adhesion-promoting layers.

Suitable transparent barrier layers to prevent the diffusion of ions, in particular of alkali metal ions, are preferably made of dielectric materials, in particular of nitrides, oxides, and oxynitrides of silicon and/or aluminum. Preferably, they have a thickness of 30 to 300 nm.

Suitable transparent, adhesion-promoting layers likewise are made of dielectric materials, in particular of mixed oxides of zinc and tin. Preferably, they have a thickness of 3 to 100 nm.

If both a transparent barrier layer and a transparent adhesion-promoting layer are present, the transparent barrier layer is bonded directly to the surface of the electrically insulating, transparent substrate.

The object according to the invention can be produced in extremely different ways. Preferably, the object according to the invention is produced according to the method according to the invention. On the other hand, the method according to the invention can also be used for the production of transparent objects other than the objects according to the invention. However, the method according to the invention develops its particular advantages in particular in the production of the object according to the invention.

Before the performance of the first step of the method according to the invention, the electrically insulating, transparent substrate can be treated thermally, cleaned, in particular degreased, and/or polished. Then, at least one of the above-described barrier layers and/or adhesion-promoting layers can be applied, whereby the methods for depositing thin layers from the gas phase described in the following can be used.

In the first step of the method according to the invention, an electrically conductive material is applied extensively to a transparent, electrically insulating substrate such that at least one, in particular, one, transparent, electrically conductive coating that contains or is made of the relevant electrically conductive material as well as at least one of the above-described localized transparent areas free of the electrically conductive coating result.

For this purpose, a mask that corresponds to the desired structure of the extensive, electrically conductive, transparent coating and of the localized transparent areas free of the electrically conductive coating can be applied on the electrically insulating, transparent substrate. Then, at least one electrically conductive material can be deposited from the gas phase onto the substrate, whereby the methods described in the following can be used.

However, a surface of the electrically insulating, transparent substrate can also be covered over its entire surface with the electrically conductive material; thereafter, the desired parts of the resultant extensive, electrically conductive, transparent coating are removed mechanically, thermally, and/or by irradiation with electromagnetic radiation. An advantageous method for mechanical removal that works very precisely is ultrasound hammering. An advantageous method for removal by means of a laser beam is described, for example, in the European patent applications EP 0 827 212 A2 and EP 1 104 030 A2.

For the application of the electrically conductive material, methods and devices known per se can be used, such as deposition from the gas phase, application from the liquid phase, or laminating of plastic films that are coated with electrically conductive materials.

Preferably, the extensive, electrically conductive, transparent coating is deposited from the gas phase, whereby common and known methods such as chemical gas phase deposition (CVD [chemical vapor deposition]) or physical gas phase deposition (PVD [physical vapor deposition]) as well as the corresponding devices suitable for this can be used. Examples of CVD methods are spray pyrolysis, chemical vapor deposition, and sol-gel deposition. Examples of PVD methods are electron beam vapor deposition and vacuum sputtering.

Preferably, sputtering methods are used.

Sputtering is a common and known method for the production of thin layers of materials that cannot be readily vaporized. In it, the surface of a solid body of suitable composition, the so-called target, is atomized by bombardment with high-energy ions from low-pressure plasmas, such as oxygen ions ($O^+$) and/or argon ions ($Ar^+$), or neutral particles, after which the atomized materials are deposited on substrates in the form of thin layers (cf. Römpp Online, 2008, "Sputtering"). Preferably, high-frequency sputtering, known as HF-sputtering, or magnetic field assisted sputtering, known as magnetron sputtering (MSVD), is used.

Suitable sputtering methods are described, for example, in the American patents U.S. Pat. No. 7,223,940 B2, col. 6, lines 25 through 38, and U.S. Pat. No. 4,985,312, col. 4, page 18, through col. 7, line 10, or in the German translation of the European patent EP 0 847 965 B1 with the file number DE 697 31 268 T2, page 8, par. [0060], and page 9, par. [0070], through page 10, par. [0072].

In the second step of the method according to the invention, the extensive, electrically conductive coating is connected in a common and known manner to two busbars such that electrical power is transmitted upon application of voltage.

In the third step of the method according to the invention, the periphery of the localized transparent area free of the electrically conductive coating is at least partially surrounded, in particular completely surrounded, with at least one of the electrically conductive bands described above such that the above-described interruptions result.

The electrically conductive bands can be applied using various suitable application methods and apparatuses, e.g., by printing or powder coating, preferably directly on the extensive, electrically conductive, transparent coating. Preferably, the electrically conductive bands are printed on, whereby conductive inks that contain highly conductive materials can be used. After printing, the resulting coatings can be further hardened thermally and/or with electromagnetic radiation or electron radiation.

Then, the electrically insulating, transparent substrates that have an extensive, electrically conductive, transparent coating, at least one localized transparent area free of the electrically conductive coating, and at least one electrically conductive band can be shaped, in particular bent or curved, at relatively high temperatures.

The temperature level is determined by the materials from which the respective insulating, transparent substrates, the extensive, electrically conductive, transparent coatings, and/or the electrically conductive bands are made. If they contain or are made of plastic, the temperature must not be set so high that the material melts and/or is thermally damaged. Preferably, in these cases, the temperature is above the glass transition temperature and below 200° C. In the case of substrates made of glass, the temperature is between 500 and 700° C., in particular 550 and 650° C.

The transparent objects according to the invention and the transparent objects produced using the method according to the invention, in particular the objects according to invention produced using the method according to the invention, can include additional functional layers and additional electrically insulating, transparent substrates.

Examples of suitable functional layers are coloring layers, layers that increase the structural stability of the objects according to the invention, light reflecting layers, and anti-reflection layers.

In particular, layers are used that increase the structural stability of the objects according to the invention. These can be adherent layers, composite films, mechanical energy absorbing films, and self-healing films made of casting resins, such as curable epoxy resins, or thermoplastic synthetics, such as polyvinyl butyral, PVB, poly(ethylene vinyl acetate), EVA, polyethylene terephthalate, PET, polyvinyl chloride, PVC, ionomer resins based on ethylene and/or propylene and alpha, beta-unsaturated carboxylic acids or polyurethane, PU, as they are known, for example, from the German translation of the European patent EP 0 847 965 B1 with the file number DE 697 31 2 168 T2, page 8, par. [0054] and [0055], or the international patent applications WO 2005/042246 A1, WO 2006/034346 A1, and WO 2007/149082 A1.

Preferably, the additional electrically insulating, transparent substrates are the above-described substrates, in particular substrates made of glass.

Preferably, the additional electrically insulating, transparent substrates are adapted in their area and shape to the objects according to the invention such that they can be connected thereto without problems.

Preferably, the resulting objects according to the invention that include additional layers and/or substrates are structured such that the localized transparent area free of the electrically conductive coating and the electrically conductive bands are in each case located in the interior of the objects according to the invention.

In the context of the use according to the invention, the objects according to the invention and the transparent objects produced using the method according to the invention, in particular the objects according to the invention produced using the method according to the invention are used advantageously in means of transportation for land, air, and water traffic, preferably in motor vehicles, such as automobiles, trucks, and trains, in aircraft and ships as well as in the furniture, equipment, and construction sector, preferably as transparent components.

Particularly preferably, the objects according to the invention are used in the form of single-sheet safety glass panes and laminated safety glass panes as window panes in means of transportation, in particular as windshields for motor vehicles, especially automobiles, as architectonic components in the construction sector, in particular for overhead glazings for roofs, glass walls, façades, window panes, glass doors, balustrades, railing glass, skylights, or glass that can be walked on, as well as components in furniture and equipment, in particular in refrigerators and deep freezer display cases.

The localized transparent area free of electrically conductive coating functions in particular as a data transmission window, specifically as a camera field and/or sensor field.

Upon application of a voltage, with the objects according to the invention the formation of hot and cold spots and/or light spots no longer occurs or only occurs to a very limited extent such that their service life is significantly extended and their transparency is not lessened even after a long service life.

In the following, the object according to the invention is explained by way of example with reference to FIGS. 1 and 2. FIGS. 1 and 2 are schematic depictions intended to illustrate the principle of the invention. The schematic depictions do not, consequently, need to be true to scale. Consequently, the size relationships depicted do not have to correspond to the size relationships used in the exercise of the invention in practice.

Figure 1:
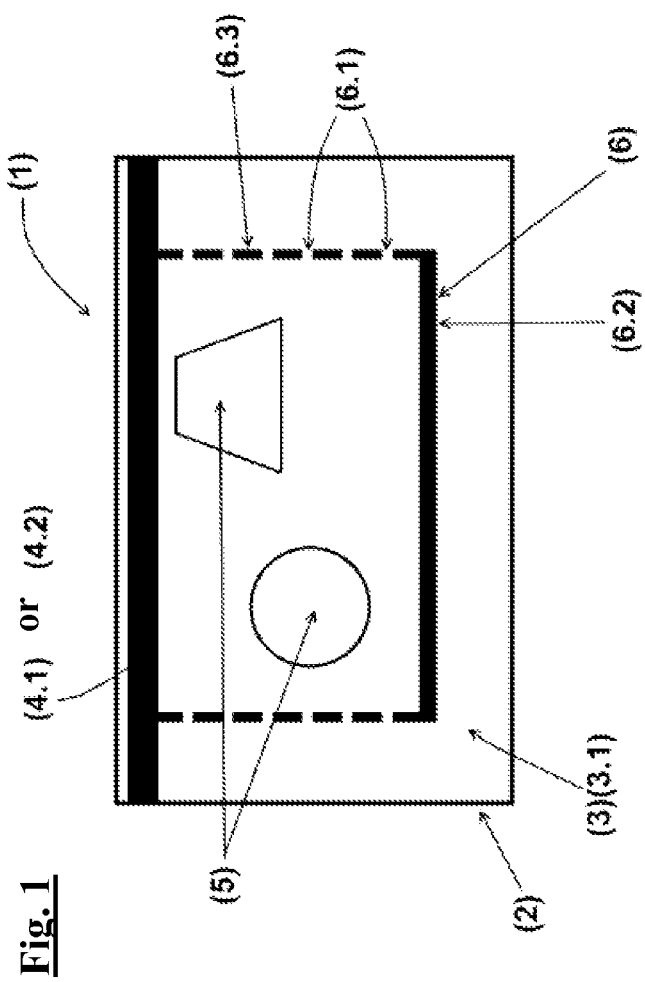
FIG. 1 depicts a first alternative for the second embodiment of the invention.
Figure 2:
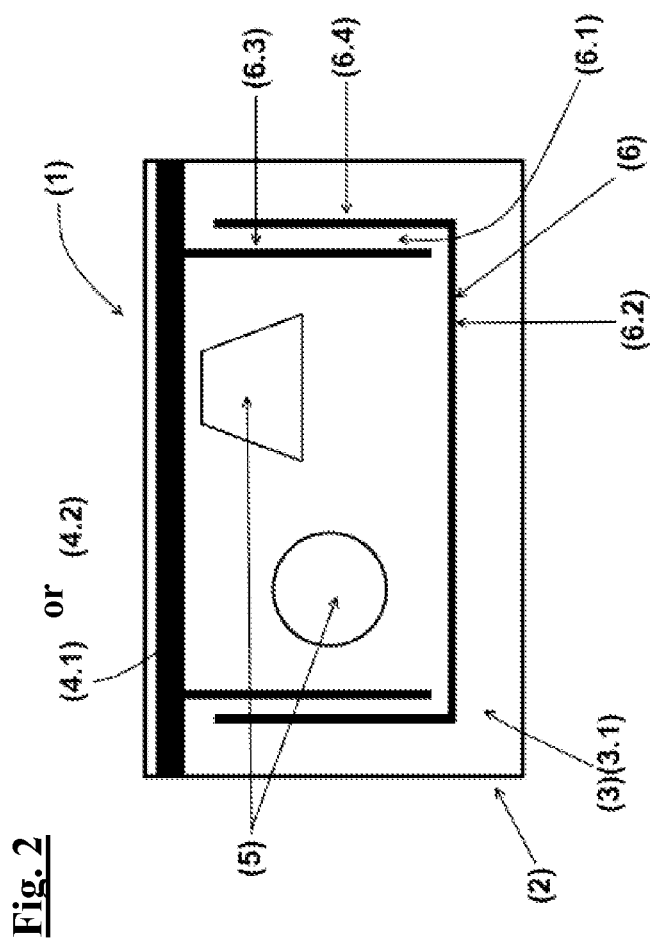
FIG. 2 depicts a second alternative for the second embodiment of the invention.

In FIGS. 1 and 2 the reference characters have the following meaning:

(1) pane-shaped, transparent object,
(2) transparent, electrically insulating substrate,
(3) extensive, electrically conductive, transparent coating,
(3.1) electrically conductive material,
(4.1), (4.2) busbars for transmission of electrical power,
(5) localized transparent area free of the electrically conductive coating (data transmission window),
(6) electrically conductive band,
(6.1) interruption,
(6.2) area of the electrically conductive band (6) that is parallel or substantially parallel to the busbars (4.1 or 4.2), to which the band (6) is connected,
(6.3) area that leads to the relevant busbar (4.1 or 4.2), and
(6.4) area that leads to the relevant busbar (4.1 or 4.2) without reaching it.

In the following, for the sake of brevity, the objects according to the invention of FIGS. 1 and 2 are referred to as "objects 1 and 2 according to the invention".

The substrates (1) of the objects 1 and 2 according to the invention are float glass panes of dimensions, as they are used, for example, for windshields, side windows, and rear windows in automobile construction, in small, medium, or large-area panes in the furniture, equipment, or construction sector. The dimensions can be several square centimeters to several square meters.

The coatings (3) of the objects 1 and 2 according to the invention are in each case a coating, as it is described in the German translation of the European patent EP 0 847 965 B1 with the file number DE 697 31 2 168 T2, Example 1, page 9, par. [0063], through page 11, par. [0080]. This layer comprises two layers made of silver as an electrically conductive material (3.1).

The data transmission windows (5) are located in the coatings (3) of the objects according to the invention 1 and 2.

The data transmission windows (5) of the object 1 according to the invention are surrounded by an electrically conductive band (6) that is 40 μm thick and is made of a commercially available printed silver-based conductivity paste. Its area (6.2), which runs parallel to the busbar (4.1), is 1 mm wide. The two areas (6.3), through which the area (6.2) is connected to the busbar (4.1), are 250 μm wide and have multiple interruptions (6.1).

The data transmission windows (5) of the object 2 according to the invention are surrounded by two electrically conductive bands (6), both of which are 40 μm thick and are made of a commercially available printed silver-based conductivity paste. The one electrically conductive band (6) is formed from two electrically conductive bands (6.3) parallel to each other that are connected to the busbar (4.1). Associated with these two bands (6.3) is an electrically conductive band (6) that consists of one area (6.2), which is parallel to the busbar (4.1), as well as of two areas (6.4), which run from the area (6.2) parallel to the areas (6.4) in the direction of the busbar (4.1), but are not connected thereto. As a result of this configuration, the interruptions (6.1) are located substantially between the areas (6.4) of the outer electrically conductive band (6) and the areas (6.3) of the inner electrically conductive band (6).

The objects 1 and 2 according to the invention are reliably bonded to each other in each case with an adhesive film made of polyvinyl butyral PVB (not shown) and a float glass pane (not shown) using a pre-bonding method (calendar rolling, serpentine, or vacuum compaction method), and an autoclave method, such that a typical structure for a laminated safety glass pane "float glass pane (1)/coating (3) with data transmission window (5) and band (6)/adhesive film/float glass pane" results.

Upon application of an electrical voltage of 12 to 14 V on the busbars (4.1) and (4.2) of the laminated safety glass panes, a current flows through the area (3), whereby it is heated to 50° C., without hot and cold spots or light spots forming.

The invention claimed is:

1. An electrically heatable, transparent object, comprising:
   a. at least one transparent, electrically insulating substrate;
   b. at least one electrically conductive transparent coating connected to two electrical busbars to transmit electrical power;
   c. at least one localized transparent area free of the electrically conductive transparent coating; and
   d. an electrically conductive band applied on the electrically conductive transparent coating, and at least partially surrounding a periphery of the at least one localized transparent area and having an electrical resistance measurable in ohms per square, the electrical resistance of the electrically conductive band being lower than the electrical resistance of the electrically conductive transparent coating in ohms per square, the electrically conductive band having at least one interruption separating a greater part of the electrically conductive band from the busbars, wherein the greater part of the electrically conductive band is not electrically interrupted, wherein the electrically conductive band has a thickness of 10 to 100 μm and an electrical resistance of less than 0.35 Ohms per square.

2. The electrically heatable, transparent object according to claim 1, wherein the at least one interruption is located in only one electrically conductive band.

3. The electrically heatable, transparent object according to claim 1, wherein the electrically conductive band has at least two interruptions.

4. The electrically heatable, transparent object according to claim 3, wherein the electrically conductive band comprises at least two electrically conductive bands having at least two interruptions, the at least two interruptions being located between at least two parallel areas of the at least two electrically conductive bands.

5. The electrically heatable, transparent object according to claim 4, wherein at least one of the at least two electrically conductive bands has at least one interruption within the band.

6. The electrically heatable, transparent object according to claim 1, wherein the electrically conductive band completely surrounds a periphery of the localized transparent area free of the electrically conductive coating.

7. The electrically heatable, transparent object according to claim 1, wherein the electrically conductive band has a width of 500 μm to 3 cm.

8. The electrically heatable, transparent object according to claim 1, wherein an area of the electrically conductive band that lies parallel or substantially parallel to the busbar is wider than an area of a portion of the electrical conductive band that leads to the busbar.

9. The electrically heatable, transparent object according to claim 1, wherein an electrically heatable area comprises a substantial portion of the transparent object.

10. The electrically heatable, transparent object according to claim 1, wherein the electrically insulating substrate comprises a glass pane.

11. The electrically heatable, transparent object according to claim 10, wherein the glass pane is a float glass pane.

* * * * *